(12) United States Patent
Kim et al.

(10) Patent No.: US 9,437,901 B2
(45) Date of Patent: Sep. 6, 2016

(54) ADDITIVE FOR ELECTROLYTE AND ELECTROLYTE AND RECHARGEABLE LITHIUM BATTERY

(71) Applicant: Samsung SDI Co., Ltd., Yongin-si, Gyeonggi-do (KR)

(72) Inventors: Duck-Hyun Kim, Yongin-si (KR); Woo-Cheol Shin, Yongin-si (KR); Sang-Il Han, Yongin-si (KR); Sang-Hoon Kim, Yongin-si (KR); Byung-Joo Chung, Yongin-si (KR); Myung-Hwan Jeong, Yongin-si (KR); Jung-Yi Yu, Yongin-si (KR); Jung-Hyun Nam, Yongin-si (KR); Seung-Tae Lee, Yongin-si (KR); Tae-Hyun Bae, Yongin-si (KR); Mi-Hyun Lee, Yongin-si (KR); Eon-Mi Lee, Yongin-si (KR); Ha-Rim Lee, Yongin-si (KR); Moon-Sung Kim, Yongin-si (KR); In-Haeng Cho, Yongin-si (KR); E-Rang Cho, Yongin-si (KR); Dong-Myung Choi, Yongin-si (KR); Vladimir Egorov, Yongin-si (KR); Makhmut Khasanov, Yongin-si (KR); Pavel Shatunov, Yongin-si (KR); Alexey Tereshchenko, Yongin-si (KR); Denis Chernyshov, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 287 days.

(21) Appl. No.: 13/799,461

(22) Filed: Mar. 13, 2013

(65) Prior Publication Data
US 2014/0134479 A1 May 15, 2014

(30) Foreign Application Priority Data
Nov. 13, 2012 (KR) .................. 10-2012-0128162

(51) Int. Cl.
*H01M 10/0567* (2010.01)
*H01M 10/052* (2010.01)

(52) U.S. Cl.
CPC ....... *H01M 10/0567* (2013.01); *H01M 10/052* (2013.01); *Y02E 60/122* (2013.01)

(58) Field of Classification Search
CPC ........................ H01M 10/567; H01M 10/52
USPC .......................................... 429/200; 558/167
See application file for complete search history.

(56) References Cited

U.S. PATENT DOCUMENTS 2,494,284 A 1/1950 Cassady et al.
3,814,610 A * 6/1974 Toy et al. .................. 106/16

(Continued)

FOREIGN PATENT DOCUMENTS

WO WO 2009/136589 A1 11/2009
WO WO 2010/107034 A1 9/2010

*Primary Examiner* — Stewart Fraser
*Assistant Examiner* — Rachel L Zhang
(74) *Attorney, Agent, or Firm* — Knobbe Martens Olson & Bear LLP (57) ABSTRACT

An electrolyte additive represented by the following Chemical Formula 1, an electrolyte, and a rechargeable lithium battery are disclosed:

[Chemical Formula 1]

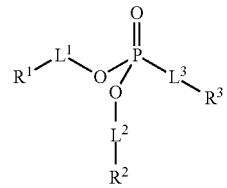

In Chemical Formula 1, $R^1$ to $R^3$ and $L^1$ to $L^3$ are the same as defined in the detailed description.

16 Claims, 5 Drawing Sheets

(56) References Cited

U.S. PATENT DOCUMENTS

| | | |
|---|---|---|
| 2003/0113635 A1 | 6/2003 | Gan et al. |
| 2011/0052980 A1 | 3/2011 | Sakata et al. |
| 2011/0311865 A1 | 12/2011 | Tatsumi et al. |
| 2012/0141883 A1 | 6/2012 | Smart et al. |
| 2013/0224604 A1* | 8/2013 | Yu et al. ............ 429/331 |
| 2013/0295470 A1* | 11/2013 | Shatunov et al. ......... 429/338 |

* cited by examiner

ADDITIVE FOR ELECTROLYTE AND ELECTROLYTE AND RECHARGEABLE LITHIUM BATTERY

CROSS-REFERENCE TO RELATED APPLICATIONS

This application claims priority to and the benefit of Korean Patent Application No. 10-2012-0128162 filed in the Korean Intellectual Property Office on Nov. 13, 2012, the entire contents of which are incorporated herein by reference.

BACKGROUND

1. Field

An electrolyte additive, and an electrolyte and a rechargeable lithium battery including the same are disclosed.

2. Description of the Related Technology

Batteries transform chemical energy generated from an electrochemical redox reaction of a chemical material in the battery into electrical energy. Such batteries are divided into a primary battery, which should be disposed after the energy of the battery is consumed, and a rechargeable battery, which can be recharged many times. The rechargeable battery can be charged/discharged many times based on the reversible transformation between chemical energy and electrical energy.

Recent developments in, high-tech electronics have allowed electronic devices to become small and light in weight, which leads to an increase in portable electronic devices. As a power source for such portable electronic devices, the demands for batteries with high energy density are increasing and researches on lithium rechargeable battery are briskly under progress.

A rechargeable lithium battery is fabricated by injecting electrolyte into an electrode assembly, which includes a positive electrode including a positive active material capable of intercalating/deintercalating lithium and a negative electrode including a negative active material capable of intercalating/deintercalating lithium.

A conventional electrolyte includes an organic solvent in which a lithium salt is dissolved and critically determines stability and performance of a rechargeable lithium battery.

SUMMARY

One embodiment provides an electrolyte additive being capable of maintaining performance while securing stability.

Another embodiment provides an electrolyte including the electrolyte additive.

Yet another embodiment provides a rechargeable lithium battery including the electrolyte.

According to one embodiment, an electrolyte additive represented by the following Chemical Formula 1 is provided.

[Chemical Formula 1]

In Chemical Formula 1,
$R_1$ and $R^2$ are independently a C1 to C10 alkyl group including at least one halogen,
$L^1$ to $L^3$ are independently a single bond or a substituted or unsubstituted C1 to C10 alkylene group, and
$R^3$ is a cyano group or a C1 to C10 alkyl group including at least one cyano group.

$R_1$ and $R^2$ may be independently —$CH_2X$, —$CHX_2$, —$CX_3$, —$CH_2(CX_3)$, —$CH(CX_3)_2$, or —$C(CX_3)_3$, wherein X is the same or different from each other and a halogen, and $R^3$ is —CN, —$CH_2(CN)$, —$CH(CN)_2$, or —$C(CN)_3$.

The halogen may include fluoro (F).

The electrolyte additive may be represented by the following Chemical Formula 2.

[Chemical Formula 2]

According to another embodiment, an electrolyte for a rechargeable lithium battery including a lithium salt, a non-aqueous organic solvent and a first additive represented by the above Chemical Formula 1 is provided.

The first additive may be represented by the above Chemical Formula 2.

The first additive may be included in an amount of about 0.01 wt % to about 50 wt % based on the total amount of the electrolyte.

The first additive may be included in an amount of about 0.1 wt % to about 30 wt % based on the total amount of the electrolyte.

The electrolyte may further include a second additive represented by the following Chemical Formula 3.

[Chemical Formula 3]

In Chemical Formula 3,
$Z^1$ to $Z^6$ are independently a halogen, a halogen-containing group, a substituted or unsubstituted $C_1$ to $C_{10}$ alkoxy group, or a substituted or unsubstituted amino group.

The second additive may be represented by the following Chemical Formula 4.

[Chemical Formula 4]

The second additive may be included in an amount of about 1 volume % to 20 volume % based on the total amount of the electrolyte.

According to yet another embodiment, a rechargeable lithium battery including a positive electrode including a positive active material, a negative electrode including a negative active material and the electrolyte is provided.

The rechargeable lithium battery may further include a passivation film at least one surface of the positive electrode and the negative electrode.

Therefore, the electrolyte additive may be used to form a stable passivation film on the surface of an electrode and accordingly, may improve battery performance and simultaneously, increase flame retardancy and thus, secure stability.

DETAILED DESCRIPTION OF THE PREFERRED EMBODIMENT

This disclosure will be described more fully hereinafter, in which example embodiments are shown. As those skilled in the art would realize, the described embodiments may be modified in various different ways, all without departing from the spirit or scope of the present embodiments.

As used herein, when a definition is not otherwise provided, the term 'substituted' may refer to one substituted with a substitutent selected from a halogen (F, Br, Cl, or I), a hydroxyl group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a $C_1$ to $C_{20}$ alkyl group, a $C_2$ to $C_{20}$ alkenyl group, a $C_2$ to $C_{20}$ alkynyl group, a $C_6$ to $C_{30}$ aryl group, a $C_7$ to $C_{30}$ arylalkyl group, a $C_1$ to $C_{20}$ alkoxy group, a $C_1$ to $C_{20}$ heteroalkyl group, $C_3$ to $C_{20}$ heteroarylalkyl group, a $C_3$ to $C_{30}$ cycloalkyl group, a $C_3$ to $C_{15}$ cycloalkenyl group, a $C_6$ to $C_{15}$ cycloalkynyl group, a $C_2$ to $C_{20}$ heterocycloalkyl group, and a combination thereof, instead of hydrogen of a compound.

As used herein, when a definition is not otherwise provided, the term 'hetero' may refer to one including 1 to 3 heteroatoms selected from, N, O, S, and P.

Hereinafter, an electrolyte additive according to one embodiment is described.

The electrolyte additive according to one embodiment is a compound represented by the following Chemical Formula 1.

[Chemical Formula 1]

In Chemical Formula 1,
$R^1$ and $R^2$ are independently a $C_1$ to $C_{10}$ alkyl group including at least one halogen,
$L^1$ to $L^3$ are independently a single bond or a substituted or unsubstituted C1 to C10 alkylene group, and
$R^3$ is a cyano group or a $C_1$ to $C_{10}$ alkyl group including at least one cyano group.

$R^1$ and $R^2$ may be independently —$CH_2X$, —$CHX_2$, —$CX_3$, —$CH_2(CX_3)$, —$CH(CX_3)_2$, or —$C(CX_3)_3$, wherein X is the same or different from each other and a halogen.

$R^3$ may be, for example —CN, —$CH_2$(CN), —CH(CN)$_2$, or —C(CN)$_3$.

The halogen may include for example fluoro (F).

The electrolyte additive may be a compound represented by the following Chemical Formula 2.

[Chemical Formula 2]

The electrolyte additive may be added to the electrolyte for a rechargeable lithium battery. The electrolyte additive may not only improve flame retardancy of the electrolyte and increase stability but also cause a decomposition reaction on the surface of an electrode and thus, form a stable passivation film and improve cycle-life characteristics of a battery.

Hereinafter, an electrolyte for a rechargeable lithium battery according to one embodiment is described.

The electrolyte for a rechargeable lithium battery according to one embodiment includes a lithium salt, a non-aqueous organic solvent, and an additive.

The lithium salt is dissolved in the non-aqueous organic solvent and supplies lithium ions in a rechargeable lithium battery, and basically operates the rechargeable lithium battery and improves lithium ion transfer between positive and negative electrodes. Such a lithium salt includes one or more of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, and LiI.

The lithium salt may be used at a concentration of about 0.1M to about 2.0M. When the lithium salt is included within the above concentration range, it may electrolyte performance and lithium ion mobility due to optimal electrolyte conductivity and viscosity.

The non-aqueous organic solvent plays a role of transmitting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like, and the ester-based solvent may include methyl acetate, ethyl acetate, n-propyl acetate, dimethylacetate, methylpropionate, ethylpropionate, gamma-butyrolactone, decanolide, gamma-valerolactone, mevalonolactone, caprolactone, and the like.

The ether-based solvent may include dibutyl ether, tetraglyme, diglyme, dimethoxyethane, 2-methyltetrahydrofuran, tetrahydrofuran and the like, and the ketone-based solvent may include cyclohexanone, and the like. The alcohol-based solvent may include ethanol, isopropyl alcohol, and the like. The aprotic solvent include nitriles such as R—CN (wherein R is a C2 to C20 linear, branched, or cyclic hydrocarbon group, and may include a double bond, an aromatic ring, or an ether bond), amides such as dimethylformamide, dimethylacetamide, dioxolanes such as 1,3-dioxolane, sulfolanes, and the like.

The non-aqueous organic solvent may be used alone or in a mixture. When the organic solvent is used in a mixture, its mixture ratio may be controlled in accordance with desirable performance of a battery.

The carbonate-based solvent may include a mixture of a cyclic carbonate and a linear carbonate. The cyclic carbonate and the linear carbonate are mixed together in a volume ratio of about 1:1 to about 1:9, which may enhance performance of an electrolyte.

In addition, the non-aqueous organic solvent may be prepared by further adding the aromatic hydrocarbon-based organic solvent to the carbonate-based solvent. The carbonate-based solvent and the aromatic hydrocarbon-based organic solvent are mixed together in a volume ratio of about 1:1 to about 30:1.

The aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The additive may include a first additive represented by the following Chemical Formula 1.

[Chemical Formula 1]

In Chemical Formula 1,
$R^1$ and $R^2$ are independently a $C_1$ to $C_{10}$ alkyl group including at least one halogen, $L^1$ to $L^3$ are independently a single bond or a substituted or unsubstituted $C_1$ to $C_{10}$ alkylene group, $R^3$ is a cyano group or a $C_1$ to $C_{10}$ alkyl group including at least one cyano group.

$R^1$ and $R^2$ may be independently —$CH_2X$, —$CHX_2$, —$CX_3$, —$CH_2(CX_3)$, —$CH(CX_3)_2$, or —$C(CX_3)_3$, wherein X is the same or different from each other and a halogen.

$R^3$ may be, for example —CN, —$CH_2(CN)$, —$CH(CN)_2$, or —$C(CN)_3$.

The halogen may include for example fluoro (F).
The first additive may be, for example a compound represented by the following Chemical Formula 2.

[Chemical Formula 2]

The first additive may not only improve flame retardancy of an electrolyte and increase stability but also cause a decomposition reaction on the surface of the electrode and form a stable passivation film and thus, improve cycle-life characteristics of a battery.

The first additive may be in an amount of about 0.01 wt % to about 50 wt % based on the total amount of the electrolyte. When the first additive is included within the range, it may effectively improve flame retardancy of the electrolyte but is decomposed on the surface of an electrode and thus, form a stable passivation film. In particular, the first additive may be included in an amount of about 0.1 wt % to about 30 wt % and specifically, about 0.3 to 20 wt % within the range.

The electrolyte may further include a second additive represented by the following Chemical Formula 3.

[Chemical Formula 3]

In Chemical Formula 3,
$Z^1$ to $Z^6$ are independently a halogen, halogen-containing group, substituted or unsubstituted $C_1$ to $C_{10}$ alkoxy group, or a substituted or unsubstituted amino group.

The halogen-containing group may be a $C_1$ to $C_{10}$ alkyl group including for example at least one halogen, and the substituted amino group may be, for example an amino group substituted with a $C_1$ to $C_{10}$ alkyl group.

The second additive may be, for example represented by the following Chemical Formula 4.

[Chemical Formula 4]

The second additive may be included in an amount of about 1 volume % to 20 volume % based on the total amount of the electrolyte. When the second additive is included within the range, flame retardancy of the electrolyte may be further improved. Specifically, the second additive may be included in an amount of about 1 volume % to about 10 volume % and specifically, about 3 volume % to about 8 volume % within the range.

Hereinafter, a rechargeable lithium battery according to another embodiment is described referring to the drawing.

Figure 1:
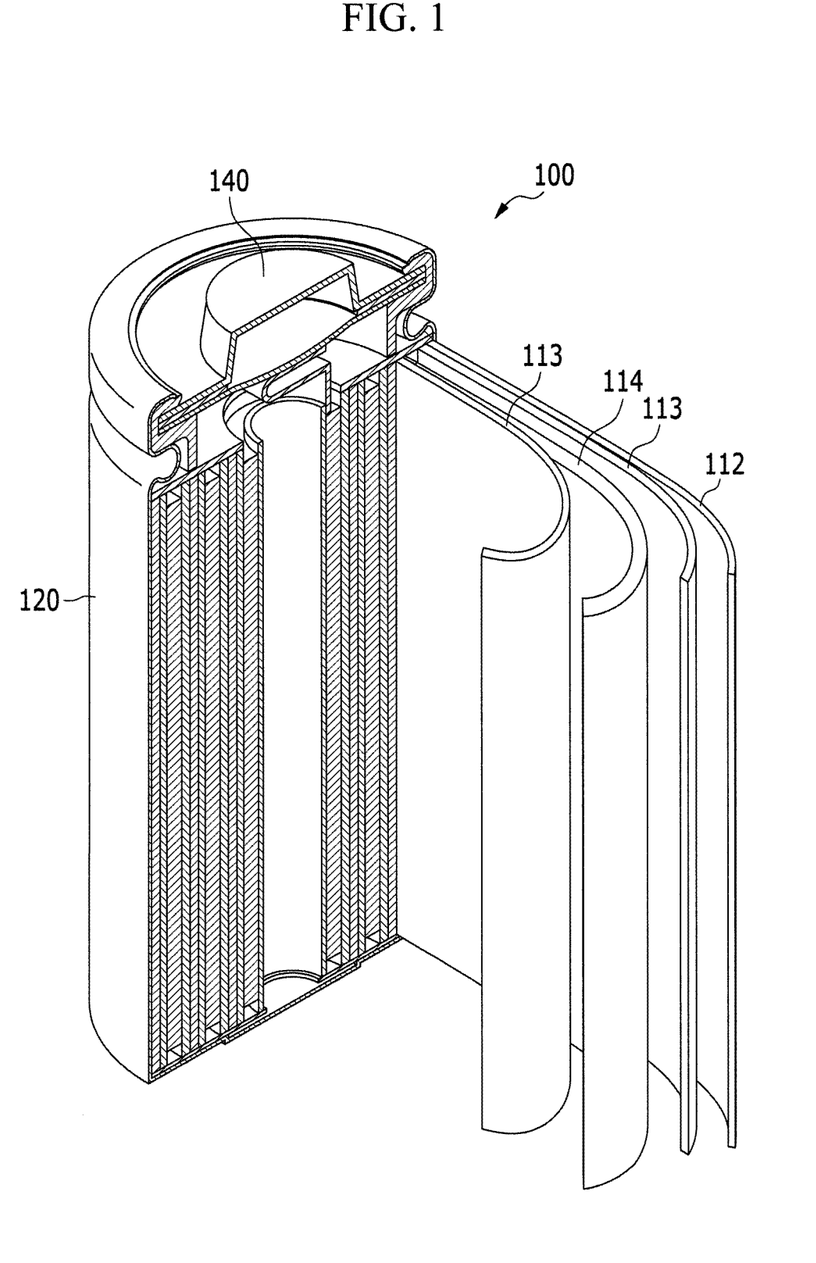
FIG. 1 is a schematic view showing a rechargeable lithium battery according to one embodiment.

FIG. 1 is a schematic view of a rechargeable lithium battery according to one embodiment.

Referring to FIG. 1, a rechargeable lithium battery 100 according to one embodiment includes an electrode assembly including a positive electrode 114, a negative electrode 112 facing the positive electrode 114, a separator 113 interposed between the positive electrode 114 and negative electrode 112, and an electrolyte for a rechargeable lithium battery (not shown) impregnating the positive electrode 114, negative electrode 112, and separator 113, a battery case 120 including the electrode assembly, and a sealing member 140 sealing the battery case 120.

The rechargeable lithium battery 100 is fabricated by sequentially laminating a negative electrode 112, a positive electrode 114, and a separator 113, spirally winding them, and housing the spiral-wound product in a battery case 120.

The negative electrode 112 may a current collector and a negative active material layer disposed on at least one side of the current collector.

The current collector may include a copper foil, a nickel foil, a stainless steel foil, a titanium foil, a nickel foam, a copper foam, a polymer substrate coated with a conductive metal, or a combination thereof.

The negative active material layer includes a binder and optionally, a conductive material.

The negative active material may include a material that reversibly intercalates/deintercalates lithium ions, a lithium metal, a lithium metal alloy, a material being capable of doping and dedoping lithium, or transition metal oxide.

The material that reversibly intercalates/deintercalates lithium ions includes a carbon material. The carbon material may be any generally-used carbon-based negative active material in a lithium ion rechargeable battery. Examples of the carbon material include crystalline carbon, amorphous carbon, and a mixture thereof. The crystalline carbon may be non-shaped or sheet, flake, spherical, or fiber shaped natural graphite or artificial graphite. The amorphous carbon may be a soft carbon, a hard carbon, mesophase pitch carbonization products, fired coke, and the like.

Examples of the lithium metal alloy include lithium and a metal of Na, K, Rb, Cs, Fr, Be, Mg, Ca, Sr, Si, Sb, Pb, In, Zn, Ba, Ra, Ge, Al, or Sn.

The material being capable of doping and dedoping lithium may include Si, $SiO_x$ (0<x<2), a Si—C composite, a Si-Q alloy (wherein Q is an alkali metal, an alkaline-earth metal, Group 13 to Group 16 elements, a transition element, a rare earth element, or a combination thereof, and is not Si), Sn, $SnO_2$, a Sn—C composite, a Sn—R alloy (wherein R is an alkali metal, an alkaline-earth metal, Group 13 to Group 16 elements, a transition element, a rare earth element, or a combination thereof, and not Sn), and the like. The elements Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may include vanadium oxide, lithium vanadium oxide, and the like.

The binder improves properties of binding active material particles with one another and a negative active material with a current collector. Examples of the binder include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of a negative electrode. Any electrically conductive material can be used as a conductive agent, unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative, and the like; or a mixture thereof.

The positive electrode 114 includes a current collector and a positive active material layer disposed on the current collector.

The current collector may be an Al, but is not limited thereto.

The positive active material layer includes a positive active material, a binder, and optionally a conductive material.

The positive active material includes lithiated intercalation compounds that reversibly intercalate and deintercalate lithium ions. The positive active material may include a composite oxide including at least one selected from the group consisting of cobalt, manganese, and nickel, as well as lithium. Specific examples may be the compounds represented by the following chemical formulae:

$Li_aA_{1-b}R_bD_2$ (0.90≤a≤1.8 and b0≤b≤0.5); $Li_aE_{1-b}R_bO_{2-c}D_c$ (0.90≤a≤1.8, 0≤b≤0.5 and 0≤c≤0.05); $LiE_{2-b}R_bO_{4-c}D_c$ (0≤b≤0.5, 0≤c≤0.05); $Li_aNi_{1-b-c}Co_bR_cD_\alpha$ (0.90≤a≤1.8, 0≤b≤0.5, 0≤c≤0.05 and 0<α≤2); $Li_aNi_{1-b-c}Co_bR_cO_{2-\alpha}Z_\alpha$ (0.90≤a≤1.8, 0≤b≤0.5, 0≤c≤0.05 and 0<α<2); $Li_aNi_{1-b-c}Co_bR_cO_{2-\alpha}Z_2$ (0.90≤a≤1.8, 0≤b≤0.5, 0≤c≤0.05 and 0<α<2); $Li_aNi_{1-b-c}Mn_bR_cD_\alpha$ (0.90≤a≤1.8, 0≤b≤0.5, 0≤c≤0.05 and 0<α<2); $Li_aNi_{1-b-c}Mn_bR_cO_{2-\alpha}Z_\alpha$ (0.90≤a≤1.8, 0≤b≤0.5, 0≤c≤0.05 and 0<α2); $Li_aNi_{1-b-c}Mn_bR_cO_{2-\alpha}Z_2$ (0.90≤a≤1.8, 0≤b≤0.5, 0≤c≤0.05 and 0<α<2); $Li_aNi_bE_cG_dO_2$ (0.90≤a≤1.8, 0≤b≤0.9, 0≤c≤0.5 and 0.001≤d≤0.1); $Li_aNi_bCo_cMn_dGeO_2$ (0.90≤a≤1.8, 0≤b≤0.9, 0≤c≤0.5, 0≤d≤0.5 and 0.001≤e≤0.1); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The positive active material may be a compound with the coating layer on the surface or a mixture of the active material and a compound with the coating layer thereon. The coating layer may include at least one coating element compound selected from the group consisting of an oxide of the coating element, a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any conventional processes unless it causes a side effect on the properties of the positive active material (e.g., spray coating, immersing), which is well known to those who have ordinary skill in this art and will not be illustrated in detail.

The binder improves binding properties of the positive active material particles to one another and to a current collector. Examples of the binder includepolyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material improves electrical conductivity of a negative electrode. Any electrically conductive material can be used as a conductive agent unless it causes a chemical change. Examples of the conductive material include natural graphite, artificial graphite, carbon black, acetylene black, ketjen black, a carbon fiber, a metal powder or a metal fiber including copper, nickel, aluminum, silver, and the like. A conductive material such as a polyphenylene derivative and the like may be mixed.

The negative and positive electrodes may be manufactured in a method of preparing an active material composition by mixing the active material and a binder, and optionally a conductive material, and coating the active material composition on a current collector. The solvent includes N-methylpyrrolidone and the like but is not limited thereto. The electrode manufacturing method is well known and thus, is not described in detail in the present specification.

The separator 113 separates the positive electrode 114 and negative electrode 112 and provides a path for transferring lithium ions. The separator 113 may be any separator that is generally used in a lithium ion battery. The separator may have low resistance against electrolyte ions and excellent moisturizing capability of an electrolyte. For example, the separator may be selected from a glass fiber, polyester, TEFLON (tetrafluoroethylne), polyethylene, polypropylene, polytetrafluoroethylene (PTFE), or a combination thereof and may have a non-woven fabric type or a fabric type. For example, a polyolefin-based polymer separator such as polyethylene, polypropylene, and the like is used for a lithium ion battery, a separator coated with a ceramic component or a polymer material may be used to secure heat resistance or mechanical strength. The separator may have a singular layer or multi-layers.

The rechargeable lithium battery may be classified as a lithium ion battery, a lithium ion polymer battery, and a lithium polymer battery according to the presence of a separator and the kind of an electrolyte used therein. The rechargeable lithium battery may have a variety of shapes and sizes and thus, may include a cylindrical, prismatic, coin, or pouch-type battery and a thin film type or a bulky type in size. The structure and manufacturing method for a lithium ion battery pertaining to the present embodiments are well known in the art.

The electrolyte is the same as described above.

The following examples illustrate the aspects of present embodiments described above, in more detail. These examples, however, should not in any sense be interpreted as limiting the scope of the present embodiments.

Synthesis of Additive

SYNTHESIS EXAMPLE 1

While mixing, 47.4 mL (0.68 mol) of bromoacetonitrile (Compound B) was added to a 1 L round-bottomed flask including 150 ml (0.68 mol) of tris(2,2,2-trifluoroethyl) phosphate (Aldrich-Sigma Co. Ltd.) (Compound A), in a dropwise fashion at room temperature under a nitrogen atmosphere. When complete with addition in a dropwise fashion, the mixture was heated up to 150° C. and constantly agitated for 48 hours under the nitrogen atmosphere. Next, the agitated mixture was cooled down to room temperature and vacuum-distilled, obtaining a compound represented by the following Chemical Formula C. The yield of the compound was 91%.

[Reaction Scheme]

$^1$H NMR (CDCl$_3$, 400 MHz): δ4.49 (4H, m, $^3J_{H\text{-}F}$, $^3J_{H\text{-}P}$), 3.11 (2H, d, $^3J_{H\text{-}P}$ = 22.2 Hz).
$^{19}$F NMR (CDCl$_3$, 400 MHz): δ-75.2 (t, $^3J_{H\text{-}F}$).

Preparation of Electrolyte

PREPARATION EXAMPLE 1

An electrolyte was prepared by adding a 1.15M LiPF$_6$ lithium salt to a mixed solvent prepared by mixing ethylene carbonate (EC), ethylmethylcarbonate (EMC), and dimethylcarbonate (DMC) in a ratio of 3/4/3 (v/v/v) and then, adding 10 wt % of the compound according to Synthesis Example 1 thereto.

COMPARATIVE PREPARATION EXAMPLE 1

An electrolyte was prepared according to the same method as Preparation Example 1 except for including no compound according to Synthesis Example 1.

Evaluation 1: Flame Retardancy

The electrolytes according to Preparation Example 1 and Comparative Preparation Example 1 were evaluated regarding flame retardancy.

The flame retardancy was evaluated by completely soaking each glass fiber filter (Glass fiber filter WHATMAN®, GF/C, 4.7 cm, 1.2 μm) in the electrolytes according to Preparation Example 1 and Comparative Preparation Example 1 respectively, setting a fire on the glass fiber filters, and measuring how long the glass fiber filters burned. The burning time may be expressed by time per unit volume (s/ml) as self-extinguishing time (SET).

The results are provided in Table 1.

TABLE 1

|  | SET (sec/ml) |
| --- | --- |
| Preparation Example 1 | 79.2 |
| Comparative Preparation Example 1 | 106.4 |

Referring to Table 1, the electrolyte according to Preparation Example 1 has a shorter self-extinguishing time (SET) than the one according to Comparative Preparation Example 1. Accordingly, the electrolyte according to Preparation Example 1 had excellent flame retardancy compared with the one according to Comparative Preparation Example 1.

Manufacture of Rechargeable Lithium Battery Cell 1

EXAMPLE 1

An electrolyte was prepared by adding a 1.15M $LiPF_6$ lithium salt to a mixed solvent prepared by mixing ethylene carbonate (EC), ethylmethylcarbonate (EMC) and dimethylcarbonate (DMC) in a ratio of 2.5/3.5/3.5 (v/v/v) and then, 1 wt % of the compound according to Synthesis Example 1 thereto.

Then, a positive electrode including $LiNi_{0.6}Co_{0.2}Mn_{0.2}O_2$, a lithium metal as a counter electrode, and the electrolyte were used to fabricate a half-cell.

COMPARATIVE EXAMPLE 1

A half-cell was fabricated according to the same method as Example 1 except for using the electrolyte according to Comparative Preparation Example 1.

Evaluation 2: Formation of Passivation Film

The half-cells according to Example 1 and Comparative Example 1 were once charged and discharged with 0.2 C, and then, passivation films on the surface of negative electrodes were evaluated.

Figure 2:
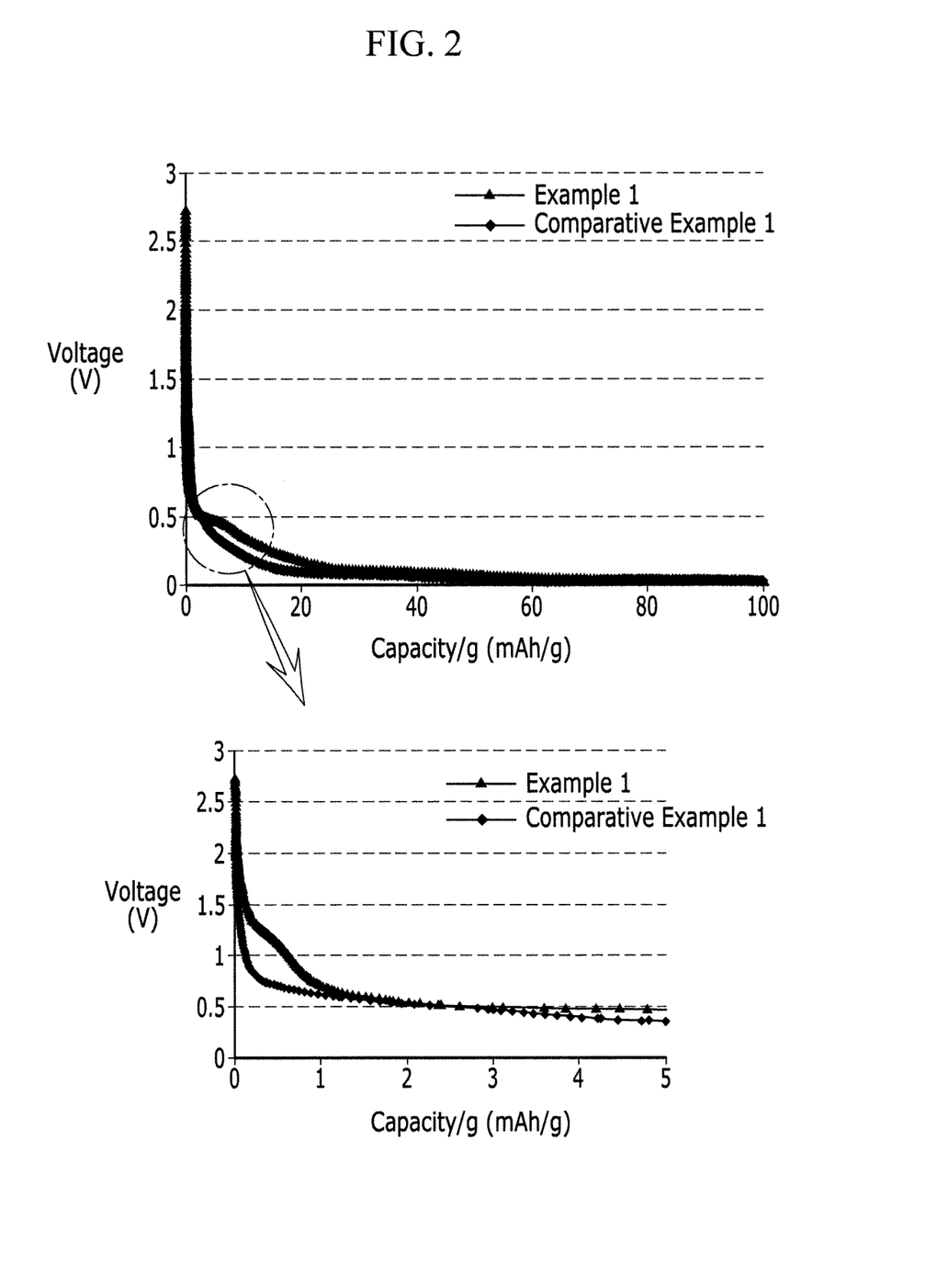
FIG. 2 is a graph showing of decomposition potentials of the electrolytes of the half-cells according to Example 1 and Comparative Example 1.
Figure 3:
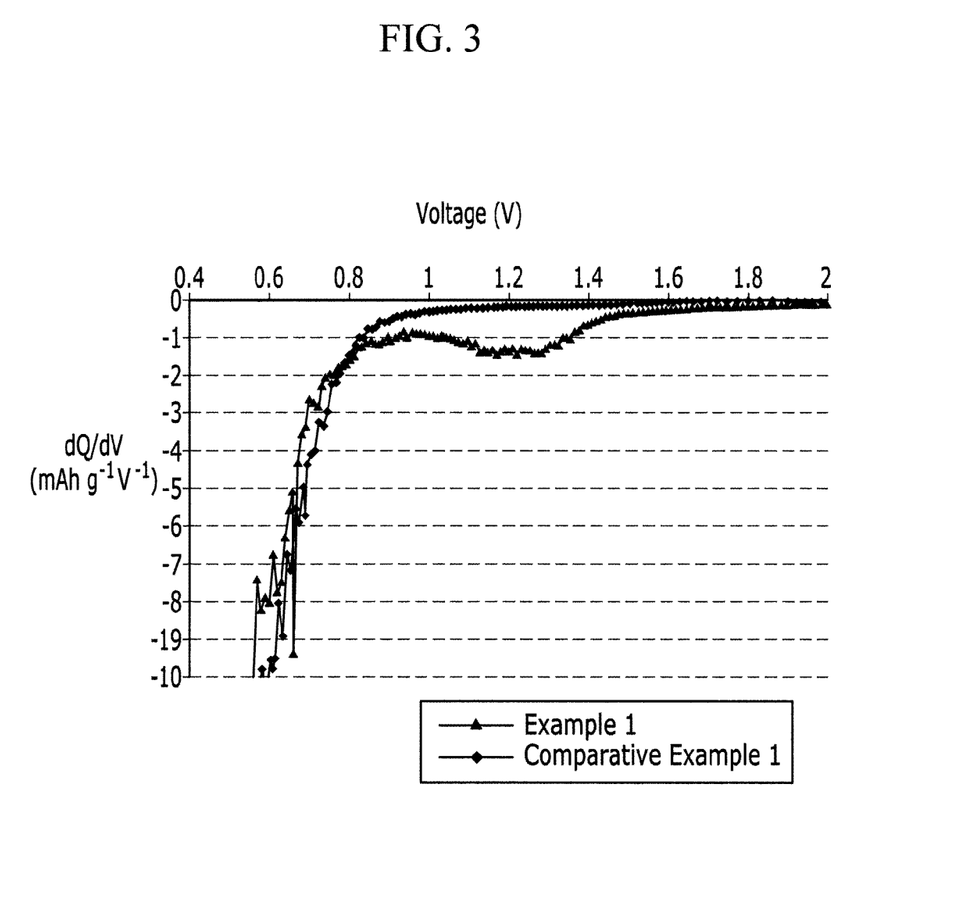
FIG. 3 is a graph showing dQ/dV variation depending on a voltage of half-cells according to Example 1 and Comparative Example 1.

The results are illustrated referring to FIGS. 2 and 3.

FIG. 2 is a graph showing decomposition potentials of the electrolytes of the half-cells according to Example 1 and Comparative Example 1, and FIG. 3 is a graph showing dQ/dV variation depending on a voltage of the half-cells according to Example 1 and Comparative Example 1.

Referring to FIGS. 2 and 3, the half-cell according to Example 1 had lower decomposition potential than the one according to Comparative Example 1. In particular, the half-cell according to Example 1 started decomposition potential at about 1.5V, which shows that the passivation film was easily formed on the surface of the negative electrode.

Manufacture of Rechargeable Lithium Battery Cell 2

EXAMPLE 2

An electrolyte was prepared by adding a 1.15M $LiPF_6$ lithium salt to a mixed solvent prepared by mixing ethylene carbonate (EC), ethylmethylcarbonate (EMC), and dimethylcarbonate (DMC) in a ratio of 2.5/3.5/3.5 (v/v/v) and then, 10 wt % of the compound according to Synthesis Example 1.

Then, the electrolyte, a positive electrode fabricated by using 92 wt % of $LiNi_{0.6}Co_{0.2}Mn_{0.2}O_2$, 4 wt % of denka black, and 4 wt % of polyvinylidenefluoride (PVdF, Solef6020), and a negative electrode including an alumina-coated graphite negative active material were used to fabricate a coin cell.

EXAMPLE 3

An electrolyte was prepared by adding a 1.15M $LiPF_6$ lithium salt to a mixed solvent prepared by mixing ethylene carbonate (EC), ethylmethylcarbonate (EMC), and dimethylcarbonate (DMC) and then, 0.5 wt % of the compound according to Synthesis Example 1 and a compound represented by the following Chemical Formula 4. Herein, the ethylene carbonate (EC), the ethylmethylcarbonate (EMC), the dimethylcarbonate (DMC), and the compound represented by the above Chemical Formula 4 were included in a ratio of 2.5/3.5/3.5/0.5 (v/v/v/v).

[Chemical Formula 4]

The electrolyte, a positive electrode fabricated by using 92 wt % of $LiNi_{0.6}Co_{0.2}Mn_{0.2}O_2$, 4 wt % of denka black, and 4 wt % of polyvinylidenefluoride (PVdF, Solef6020), and a negative electrode including an alumina-coated graphite negative active material were used to fabricate a coin cell.

COMPARATIVE EXAMPLE 2

A coin cell was fabricated according to the same method as Example 2 except for using an electrolyte including no compound according to Synthesis Example 1.

COMPARATIVE EXAMPLE 3

A coin cell was fabricated according to the same method as Example 3 except for using an electrolyte including no compound according to Synthesis Example 1.

Evaluation 3: Cycle-Life Characteristic

The coin cells according to Examples 2 and 3 and Comparative Examples 2 and 3 were evaluated regarding cycle-life characteristics.

The cycle-life characteristics were evaluated by 200 times or 80 times charging and discharging the coin cells according to Examples 2 and 3 and Comparative Examples 2 and 3 at 25° C. with 1 C and then, measuring discharge capacity at each cycle.

Figure 4:
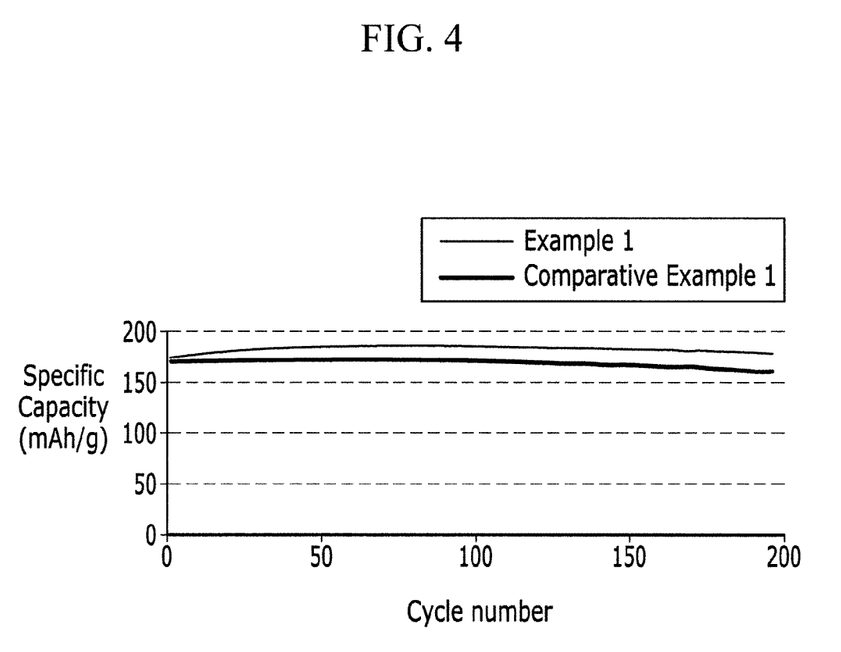
FIG. 4 is a graph showing cycle capacity retention of coin cells according to Example 2 and Comparative Example 2.
Figure 5:
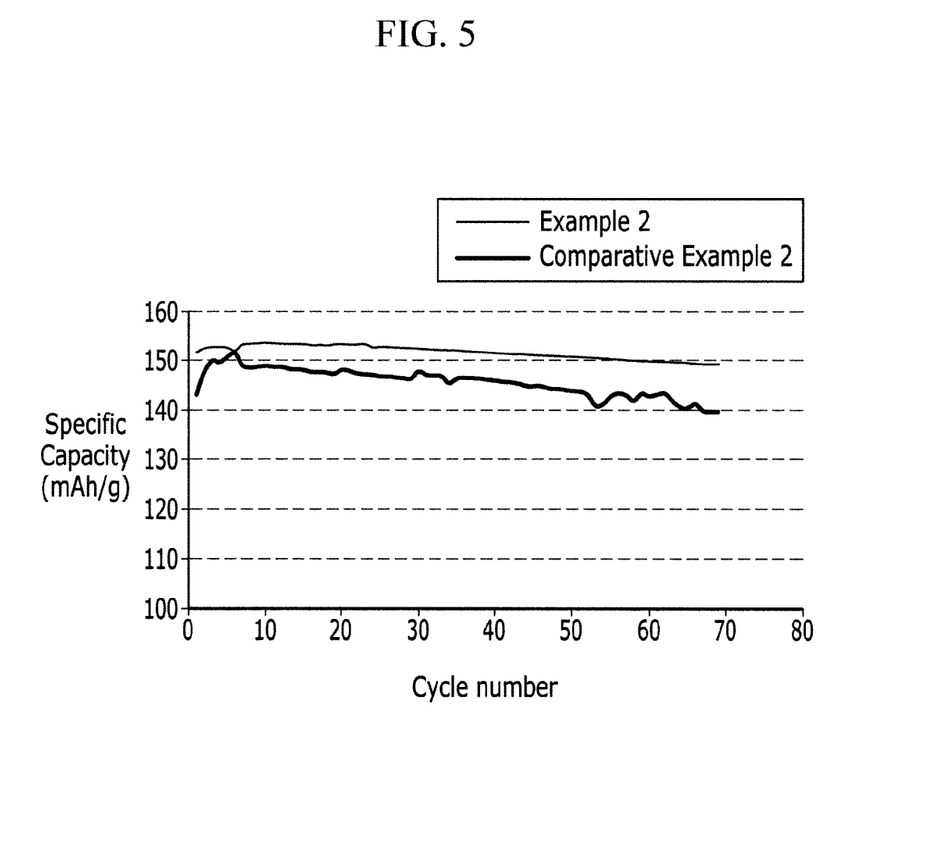
FIG. 5 is a graph showing cycle capacity retention of coin cells according to Example 3 and Comparative Example 3.

The results are provided in FIGS. 4 and 5.

FIG. 4 is a graph showing cycle capacity retention of the coin cells according to Example 2 and Comparative Example 2, and FIG. 5 is a graph showing cycle capacity retention of the coin cells according to Example 3 and Comparative Example 3.

Referring to FIGS. 4 and 5, the coin cells according to Examples 2 and 3 had higher cycle capacity retention than the ones according to Comparative Examples 2 and 3.

While this disclosure has been described in connection with what is presently considered to be practical example embodiments, it is to be understood that the embodiments are not limited to the disclosed embodiments, but, on the contrary, is intended to cover various modifications and equivalent arrangements included within the spirit and scope of the appended claims.

What is claimed is:

1. An electrolyte for a rechargeable lithium battery, comprising:
a lithium salt,
a non-aqueous organic solvent, and
a first additive represented by the following Chemical Formula 1:

[Chemical Formula 1]

wherein,
$R^1$ and $R^2$ are independently $C_1$ to $C_{10}$ alkyl groups including at least one halogen,
$L^1$ to $L^2$ are independently a single bond or a substituted or unsubstituted $C_1$ to $C_{10}$ alkylene group,
$L^3$ is a single bond or a substituted or unsubstituted $C_1$ alkylene group, and
$R^3$ is a cyano group or a $C_1$ to $C_{10}$ alkyl group including at least one cyano group.

2. The electrolyte for a rechargeable lithium battery of claim 1, wherein $R^1$ and $R^2$ are independently —$CH_2X$, —$CHX_2$, —$CX_3$, —$CH_2(CX_3)$, —$CH(CX_3)_2$, or —$C(CX_3)_3$, wherein X is the same or different from each other and a halogen, and $R^3$ is —CN, —$CH_2(CN)$, —CH$(CN)_2$, or —$C(CN)_3$.

3. The electrolyte of claim 1, wherein the halogen comprises fluoro (F).

4. The electrolyte of claim 1, wherein the first additive is represented by the following Chemical Formula 2:

[Chemical Formula 2]

5. The electrolyte of claim 1, wherein the first additive is included in an amount of about 0.01 to about 50 wt % based on the total amount of the electrolyte.

6. The electrolyte of claim 1, wherein the first additive is included in an amount of about 0.1 to about 30 wt % based on the total amount of the electrolyte.

7. The electrolyte of claim 1, wherein the electrolyte further comprises a second additive represented by the following Chemical Formula 3:

[Chemical Formula 3]

wherein, in Chemical Formula 3, $Z^1$ to $Z^6$ are independently a halogen, halogen-containing group, substituted or unsubstituted $C_1$ to $C_{10}$ alkoxy group, or a substituted or unsubstituted amino group.

8. The electrolyte of claim 7, wherein the second additive is represented by the following Chemical Formula 4:

[Chemical Formula 4]

9. The electrolyte of claim 7, wherein the second additive is included in an amount of about 1 to 20 volume % based on the total amount of the electrolyte.

10. A rechargeable lithium battery, comprising
a positive electrode including a positive active material,
a negative electrode including a negative active material, and
an electrolyte comprising:
a lithium salt,
a non-aqueous organic solvent, and
a first additive represented by the following Chemical Formula 1:

[Chemical Formula 1]

wherein,
$R^1$ and $R^2$ are independently $C_1$ to $C_{10}$ alkyl groups including at least one halogen,
$L^1$ to $L^2$ are independently a single bond or a substituted or unsubstituted $C_1$ to $C_{10}$ alkylene group,
$L^3$ is a single bond or a substituted or unsubstituted $C_1$ alkylene group, and
$R^3$ is a cyano group or a $C_1$ to $C_{10}$ alkyl group including at least one cyano group.

11. The rechargeable lithium battery of claim 10, which further comprises a passivation film at least one surface of the positive and negative electrodes.

12. The rechargeable lithium battery of claim 10, wherein $R^1$ and $R^2$ are independently —$CH_2X$, —$CHX_2$, —$CX_3$, —$CH_2(CX_3)$, —$CH(CX_3)_2$, or —$C(CX_3)_3$, wherein X $X_2$ and $X_3$ are the same or different from each other and a halogen, and $R^3$ is —CN, —$CH_2(CN)$, —CH $(CN)_2$, or —$C(CN)_3$.

13. The rechargeable lithium battery of claim 10, wherein the halogen comprises fluoro (F).

14. The rechargeable lithium battery of claim 10, wherein the first additive is represented by the following Chemical Formula 2:

[Chemical Formula 2]

15. The rechargeable lithium battery of claim 10, wherein the electrolyte further comprises a second additive represented by the following Chemical Formula 3:

[Chemical Formula 3]

wherein, in Chemical Formula 3, $Z^1$ to $Z^6$ are independently a halogen, halogen-containing group, substituted or unsubstituted $C_1$ to $C_{10}$ alkoxy group, or a substituted or unsubstituted amino group.

16. The rechargeable lithium battery of claim 15, wherein the second additive is represented by the following Chemical Formula 4:

[Chemical Formula 4]

* * * * *